N. Hinman.
Grain Elevator.
N° 89,406.  Patented Apr. 27, 1869.
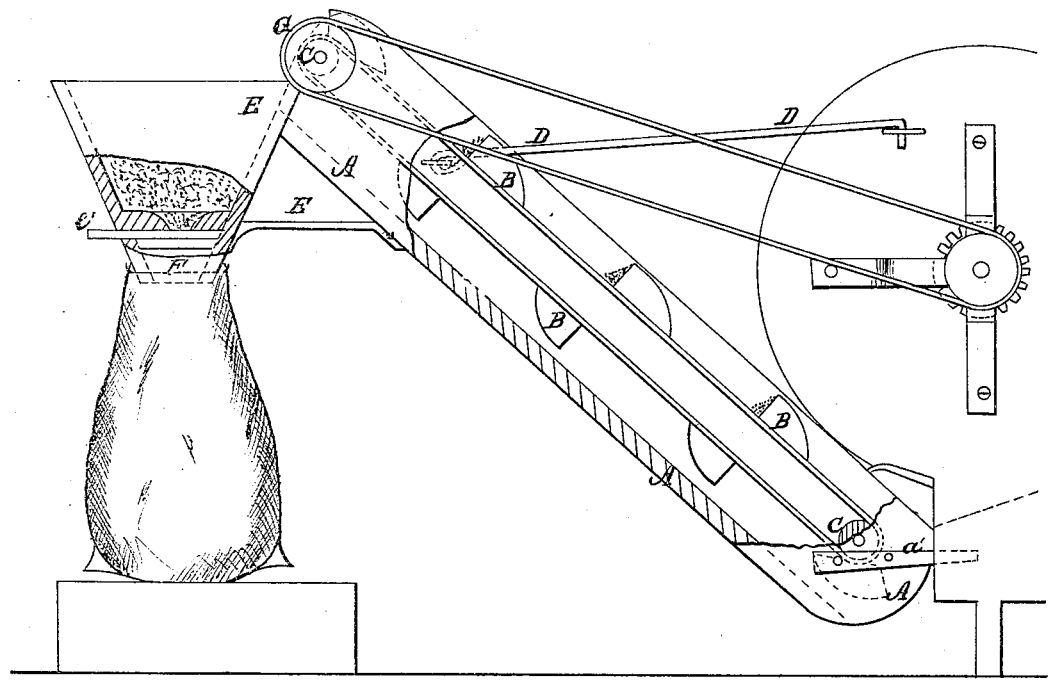
Witnesses,
A. W. Almqvist
Fred Morgan
Inventor
N. Hinman
per Munn & Co
Attorneys

NEWELL HINMAN, OF SPARTA CENTRE, MICHIGAN.

Letters Patent No. 89,406, dated April 27, 1869.

IMPROVEMENT IN ELEVATOR-ATTACHMENT FOR FANNING-MILLS.

The Schedule referred to in these Letters Patent and making part of the same.

*To all whom it may concern:*

Be it known that I, NEWELL HINMAN, of Sparta Centre, in the county of Kent, and State of Michigan, have invented a new and improved Elevator-Attachment for Fan-Mills; and I do hereby declare that the following is a full, clear, and exact description thereof, which will enable those skilled in the art to make and use the same, reference being had to the accompanying drawings, forming part of this specification, in which the figure is a side view of my improved elevator-attachment, parts being broken away to show the construction.

My invention has for its object to furnish an improved elevator-attachment for fan-mills, by means of which the cleaned grain, as it runs from the mill, is raised up and discharged into the hopper, from which it may be allowed to flow into bags or other receptacles; and It consists in the arrangement of the elevator and its attachments with reference to the fan-mill, as will be hereinafter more fully described.

A represents a box or spout, the lower end and side of which are made close.

B is an endless chain of buckets, which passes around the rollers C, pivoted in the ends of the box A.

$a'$ are two bolts, attached to the lower end of the box A, and which are designed to pass through holes in the base-board at the front of the mill.

The lower end of the box A should be so formed as to fit upon the end of the spout through which the cleaned grain passes from said mill, so as to receive all the grain as it flows out.

The upper side of the box A rests against the forward end or bulge of the mill, and is secured in place by long hooks, D, or equivalent connections, the rear ends of which are pivoted to the upper part of the sides of the box A, and the other or hook-ends of which hook into staples attached to the forward part of the fan-mill.

To the upper part of the box A is attached a hopper, E, in such a position as to receive the grain from the buckets B, as they pass over the upper roller C.

To the lower end of the hopper E is attached a number of hooks, for the attachment of a bag or sack to receive the grain.

The discharge-orifice in the bottom of the hopper E is provided with a sliding gate, $e'$, so that it may be closed, and one receptacle for the grain removed and another arranged in place without stopping the mill.

The hopper E is further secured in place by the brace F, one end of which is attached to the hopper E, and its other end to the box A.

To the projecting end of the journal of the upper roller C is attached a pulley, G, around which passes a band, which is connected with the fan-shaft of the mill by passing around said shaft or a pulley attached thereto.

If desired, said band may pass around a pulley attached to a shaft working in bearings attached to the side of the mill, and provided with a gear-wheel meshing into the teeth of the drive-wheel of said mill.

The manner in which the apparatus is connected with the driving-mechanism of the mill must depend upon the construction of said mechanism, and must therefore necessarily vary with the different kinds of mills with which it may be connected.

I claim as new, and desire to secure by Letters Patent—

The arrangement of the box A, endless chain of buckets B, hopper E, bolts $a'$, and hooks D, with relation to the fan-mill, as herein shown and described.

NEWELL HINMAN.

Witnesses:
J. B. TAYLOR,
R. W. WOODIN.